United States Patent
Kim et al.

(10) Patent No.: US 8,599,970 B2
(45) Date of Patent: Dec. 3, 2013

(54) SYSTEMS, METHODS, AND APPARATUSES FOR DETECTING DIGITAL TELEVISION (DTV) COMMUNICATIONS SIGNALS

(75) Inventors: Andrew Joo Kim, Atlanta, GA (US); Seungmok Oh, Atlanta, GA (US); Matthew Kuhn, Atlanta, GA (US); Bob Nayar, Suwanee, GA (US); Youngsik Hur, Atlanta, GA (US)

(73) Assignee: Samsung Electro-Mechanics, Gyunngi-Do (KR)

( * ) Notice: Subject to any disclaimer, the term of this patent is extended or adjusted under 35 U.S.C. 154(b) by 497 days.

(21) Appl. No.: 12/945,196

(22) Filed: Nov. 12, 2010

(65) Prior Publication Data

US 2011/0169965 A1    Jul. 14, 2011

Related U.S. Application Data

(60) Provisional application No. 61/293,321, filed on Jan. 8, 2010.

(51) Int. Cl.
*H04L 27/06* (2006.01)
*H04N 5/44* (2011.01)

(52) U.S. Cl.
USPC .......................................... 375/340; 348/725

(58) Field of Classification Search
USPC ......... 375/316, 324, 326, 340, 342, 343, 346; 348/180, 725, 726, 731
See application file for complete search history.

(56) References Cited

U.S. PATENT DOCUMENTS

| | | | |
|---|---|---|---|
| 2008/0165680 A1* | 7/2008 | Chang | 370/230 |
| 2009/0102981 A1* | 4/2009 | Mody | 348/732 |
| 2010/0134699 A1* | 6/2010 | Gao et al. | 348/731 |
| 2011/0043710 A1* | 2/2011 | Samarasooriya et al. | 348/735 |

OTHER PUBLICATIONS

Y. Zeng and Y. Liang, "Covariance based sensing algorithms for detection of DTV and wireless microphone signals," IEEE document 802.22-06/0187-01-0000, Nov. 10, 2006.
Y. Zeng and Y. Liang, "Maximum-Minimum Eigenvalue Detection for Cognitive Radio," IEEE Symp. PIMRC, 2007.
W. Gardner, "Exploitation of Spectral Redundancy in Cyclostationary Signals," IEEE SP Magazine, Apr. 1991, pp. 14-36.

(Continued)

*Primary Examiner* — Sam K Ahn
*Assistant Examiner* — Vineeta Panwalkar (57) ABSTRACT

A received RF signal is down-converted to a baseband or low-IF digitized signal in order to search for a pilot signal that indicates a presence of a DTV signal such as an ATSC DTV signal. The pilot signal characteristically resides in a fixed frequency range for all valid DTV signals and is extracted by processing the baseband or low-IF signal in multiple stages. The first stage reduces signal information to that pertaining to the frequency band covering all valid pilot frequencies, thereby reducing the sampling rate and computational complexity of subsequent operations. A second stage operates on this reduced rate signal to focus on a series of particular pilot frequencies for interrogation. For each such candidate frequency, the cyclostationarity of the signal is measured and tested for statistical significance relative to the background energy to yield an effective test that is invariant with respect to background noise level.

20 Claims, 9 Drawing Sheets

(56) References Cited

OTHER PUBLICATIONS

W. Gardner, "Spectral Correlation of Modulated Signals: Part I—Analog Modulation," IEEE Trans. On Comms., vol. 35, No. 6, Jun. 1987, pp. 584-594.

W. Gardner, et al., "Spectral Correlation of Modulated Signals: Part II—Digital Modulation," IEEE Trans. On Comms., vol. 35, No. 6, Jun. 1987, pp. 595-601.

S. Enserink and D. Cochran, "A Cyclostationary Feature Detector," IEEE Asilomar Conf. Proc., Oct. 1994, pp. 806-810.

* cited by examiner

SYSTEMS, METHODS, AND APPARATUSES FOR DETECTING DIGITAL TELEVISION (DTV) COMMUNICATIONS SIGNALS

RELATED APPLICATION

The present application is a non-provisional application claiming priority to U.S. Provisional Application No. 61/293,321, filed on Jan. 8, 2010, and entitled "SYSTEMS, METHODS, and APPARATUSES FOR DETECTING DTV COMMUNICATIONS SIGNALS," which is hereby incorporated by reference in its entirety as if fully set forth herein.

FIELD OF THE INVENTION

Embodiments of the invention relate generally to the field of communications and more specifically to the detection of digital television (DTV) signals in cognitive radio systems.

BACKGROUND OF THE INVENTION

The premise of a cognitive radio (CR) is to increase the utilization of airwave spectra for radio frequency (RF) communications by using locally unoccupied channels or frequency bands for unlicensed wireless communications. The specific details governing operation of CR have been defined by standards bodies such as the IEEE 802.22 group and CogNeA alliance.

Central to the operation of CR communications devices is the detection of an incumbent Advanced Television Systems Committee (ATSC) digital television (DTV) signal that may reside in the same frequency range as CR devices depending on geographic locale. Indeed, prior to using any frequency band, it is crucial that a CR device verify that the frequency band is not occupied by an ATSC DTV signal. Otherwise, the CR device's communications signal could interfere with the DTV signal and thereby prevent television reception in sets in close proximity to the CR device. Thus, it is necessary that the CR device be able to sense or detect DTV signals at power levels that could be otherwise received in the absence of a CR device as defined by standards and government regulations. This establishes the a key requirement of DTV sensing methods and systems—that they be able to sense weak DTV signals, such as signals as low as 10 dB below the thermal noise floor, i.e. −116 dBm, as defined by the IEEE 802.22-05/0007r47 functional requirements document.

In addition to requiring a CR to sense a channel or frequency band prior to communications use, a CR device must periodically sense the frequency band during use to account for a possible change in environment. Such a change is intended to account for the possibility of an erroneous "missed detection" of a DTV signal due to channel fading on the initial detection operation. The periodic sensing would also account for the movement of a CR device from a location absent of a DTV signal to a location with a DTV signal.

The periodic sensing aspect imposes another key requirement of DTV detection methods and systems—that they perform their sensing operation in as short a time as possible. Rapidity is essential because sensing cannot occur simultaneously with communications since the CR communications signal would otherwise drown out or mask the DTV signal. Consequently, the fraction of time spent performing DTV signal detection directly takes away from time that could be used for communications and therefore degrades throughput efficiency.

Yet another requirement of DTV sensing methods and systems is that they be flexible to the amount of ambient background noise radiation. In practice, the amount of background noise can be affected by many factors and in particular by nearby electronics and communications devices. Viable DTV sensing techniques need to be able to maintain a pre-specified false alarm rate (FAR) or equivalently probability of false alarm ($P_{FA}$), e.g. $P_{FA}$=10% according to the IEEE 802.22 group, regardless of the background noise level. Techniques that are not invariant to the background noise level can easily exceed this false alarm rate as large noise spurs trigger incorrect DTV detection classifications.

A fourth key aspect of a commercially viable DTV sensing solution is that it be of reasonable cost and hence complexity. Like all consumer electronics, cost is a key factor in success and a sensing solution which satisfies the first three technical key requirements is moot if it is not commercially viable.

A variety of methods have been proposed in the prior art for the task of DTV signal detection, but these methods are inadequate as they do not satisfy one of the key requirements mentioned above. For example, as described by Zeng and Liang in "Covariance based sensing algorithms for detection of DTV and wireless microphone signals," IEEE document 802.22-06/0187-01-0000, Nov. 10, 2006, and "Maximum-Minimum Eigenvalue Detection for Cognitive Radio," *IEEE Symp. PIMRC*, 2007, spectral energy-based detection methods can be effective for quickly detecting DTV signals, but these methods have to make prior assumptions on the background noise level, and when the noise level estimate is even slightly erroneous, detection performance decreases dramatically. Thus, Zeng and Liang propose covariance matrix based methods, but these methods can become quite computationally intensive as (i) the computation of a covariance matrix is an intensive task and (ii) eigenvalue based techniques involve matrix inversions which are extremely computationally intensive tasks.

Another category of signal detection techniques exploit the signal property of cyclostationarity developed by Gardner and summarized in "Exploitation of Spectral Redundancy in Cyclostationary Signals," *IEEE SP Magazine*, April 1991, pp. 14-36; "Spectral Correlation of Modulated Signals: Part I—Analog Modulation," *IEEE Trans. On Comms.*, vol. 35, no. 6, June 1987, pp. 584-594; and W. Gardner, et al., "Spectral Correlation of Modulated Signals: Part II—Digital Modulation," *IEEE Trans. On Comms.*, vol. 35, no. 6, June 1987, pp. 595-601. In those works, Gardner proposes the use of cyclic autocorrelation or spectral correlation density (SCD) as the detection test statistic to exploit higher-order signal structure. However, as noted by Enserink and Cochran in "A Cyclostationary Feature Detector," *IEEE Asilomar Conf Proc.*, October 1994, pp. 806-810, Gardner's use of cyclic autocorrelation or SCD yields test statistics in which the false alarm rates are not invariant to the level of background noise, thus violating at least the third key aspect of DTV sensing for CR applications. To remedy this shortcoming, Enserink and Cochran propose a system that estimates the spectral auto-coherence function (SACF) evaluated at spectral frequency $f_c-v$ and cyclic frequency $\alpha/2$. In other words, it computes the cyclic-correlation between frequencies $f_c-v+\alpha/2$ and $f_c-v/2$. A major drawback to the approach proposed by Enserink and Cochran is however that system precludes making full use of the entire sensing time interval to maximize frequency resolution, i.e. coherent averaging.

Thus, there is a need in the industry for systems, methods, and apparatuses for detecting DTV communications signals that remedy one or more of the above-described deficiencies or yet other deficiencies.

BRIEF SUMMARY OF THE INVENTION

Embodiments of the invention may support a method and system for detecting a DTV communications signal. Indeed, an embodiment of the invention may be able to detect weak signals, for example, those that are weaker than the background noise energy such as those with a signal-to-noise-ratio (SNR) of −20 dB or less. Furthermore, DTV signal sensing can be done in a short, prespecified time period ranging from a millisecond to over a second with longer sensing times providing better detection sensitivity and lower error rates. The false alarm rate (FAR) in accordance with an example embodiment of the invention may be invariant to the level of background noise, and thus may allow consistent FAR performance in a variety of environments without prior knowledge of the level of background noise. One or more of the foregoing can be accomplished with baseband (BB) digital signal processing after converting the received DTV signal from its communicated RF frequency down to a low-intermediate frequency (IF) or BB frequency, thereby enabling an economically viable low-cost solution.

According to a first embodiment of the invention, there may be an efficient means of detecting a DTV signal (previously down-converted to baseband or a low IF frequency) for a plurality of cyclic frequencies by dividing the processing into two or more stages. In particular, the baseband or low-IF DTV signal is first optionally modulated to a frequency convenient for processing via an optional modulator. Frequency-domain conjugate symmetry may then be imposed on the signal by taking the real part of the output of optional modulator in a real-operator block to generate a test signal. Cyclostationarity, i.e. the presence of the conjugate-symmetric DTV pilot signal at cyclic frequency α, is then tested via a two (or more) stage procedure for computational efficiency. An initial coarse focusing stage may isolate the band of cyclic frequencies at which the DTV pilot signal may possibly reside. The initial coarse focusing stage may conclude with a decimator operation that reduces the number of samples used to represent that candidate pilot band. A subsequent fine focusing stage may then isolate a particular cyclic frequency within the candidate band. It will be appreciated that this embodiment may offer significant computational complexity savings over the other prior approaches, such as that proposed by Enserink and Cochran when multiple cyclic frequencies are interrogated. In contrast to the prior approach of Enserink and Cochran, the full rate modulation and filtering need only be performed only once with the presently proposed approach, regardless of the number of cyclic frequencies to be tested. Subsequent testing of each of the individual cyclic frequencies may then be performed on the decimated output of the initial focusing stage. This decimation can be on the order of up to thousands, thus providing tremendous computational savings, according to an example embodiment of the invention. It will be appreciated that by dividing the processing into multiple stages, computational complexity of the low-pass filter (LPF) in the first stage can be reduced. In particular, the LPF in the first stage may need to be very narrowband with the potential to be a very high-order filter. However, performing the filtering operation as a cascade of alternating LPF and decimation stages may significantly reduce the filter order or length required to achieve the same narrowband characteristics.

It will be appreciated that noise level estimates may be determined from either the output of the initial coarse focusing stage or the subsequent fine focusing stage. However, by using the output of the initial focusing stage, the estimation of the background noise energy level can be taken from a frequency band larger than the cyclic frequency band for which cyclostationarity is being tested. The use of this larger frequency band may result in much higher statistical significance of the background noise level estimate. In particular, the quality of the estimate does not degrade as the amount of averaging increases. In other words, the background energy estimate does not degrade as cyclic frequency resolution is made finer. It will be appreciated that this may allow for significantly higher detection performance than the prior approach of Enserink and Cochran.

It will also be appreciated that the computational complexity of the fine focusing stage can be significantly reduced by replacing it with a Discrete Fourier Transform (DFT) calculation. In particular, maximizing the amount of filtering in the fine focusing stage, i.e. making cyclic frequency resolution as fine as possible, may correspond to taking a Discrete Fourier Series coefficient of the sequence of input samples into a first branch of the fine focusing stage, and taking an Inverse Discrete Fourier Series coefficient of the sequence of input samples into a second branch of the fine focusing stage. Given the sequence of output samples from the first and second branches of the initial focusing stage, the SCD estimate for all candidate cyclic frequencies to be tested can be obtained by: taking the discrete Fourier transform (DFT) of the output of the first branch of the initial focusing stage and the inverse discrete Fourier transform (IDFT) of the output of the second branch of the initial focusing stage, followed by multiplying the pairwise outputs of the DFT and conjugated IDFT. Each of these pairwise multiplications may represent the SCD for a particular cyclic frequency to be tested. Thus, rather than having to perform the fine focusing stage for each individual cyclic frequency, the SCD can be computed for all cyclic frequencies to be computed at once in the computationally simpler DFT/IDFT calculation, according to an example embodiment of the invention. The magnitude-square of these SCD values can then be evaluated and the system can choose the largest such value via a maximum operation. This maximizing value of the SCD may also be the maximizing value of the SACF which is obtained by normalization with respect to the background energy estimates described herein.

The above discussion is provided for illustrative purposes only. Indeed, as described herein, many variations are possible without departing from example embodiments of the invention.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings in which some, but not all, embodiments of the invention are shown. Indeed, these inventions may be embodied in many different forms and should not be construed as limited to the embodiments set forth herein; rather, these embodiments are provided so that this disclosure will satisfy applicable legal requirements. In other instances, well known methods, procedures, components, and representations are not described in detail because they would obscure the invention in unnecessary detail. Like numbers refer to like elements throughout.

Figure 1:
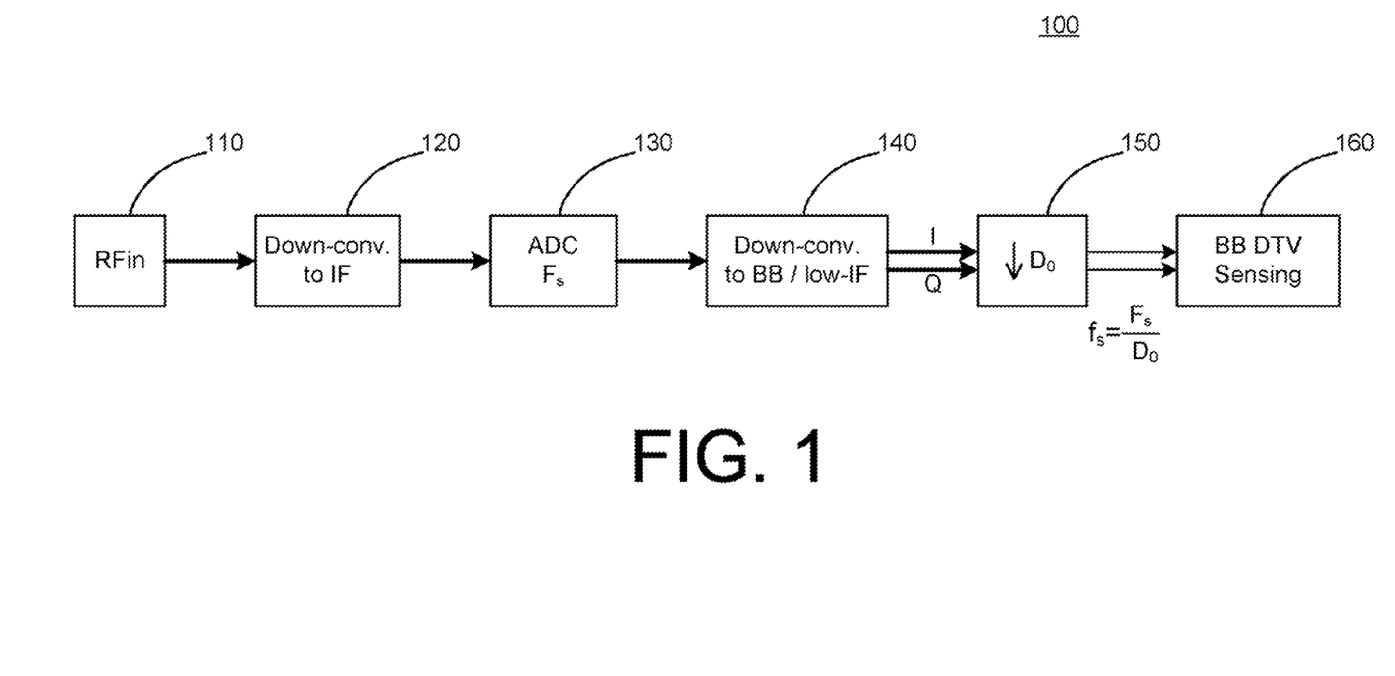
FIG. 1 illustrates an example of a system supporting digital television (DTV) signal detection, according to an example embodiment of the invention.

FIG. 1 illustrates an example of a system 100 supporting digital television (DTV) signal detection, according to an example embodiment of the invention. In general, the system 100 may be configured to convert a radio frequency (RF) airwave signal, at a frequency which can contain an RF DTV signal, into a low intermediate-frequency (IF) or baseband (BB) digital signal for processing to detect one or more DTV signals. In particular, the system 100 may include a receiver or receiver means 110 for receiving the RF signal, including the RF DTV signal, transmitted over the airwaves. Such a receiver or receiver means 110 can include an antenna, amplifier, and RF tuner, according to an example embodiment of the invention. The system 100 can also include an RF to IF down-converter 120 that modulates the RF signal to a lower IF frequency, possibly even DC (i.e., 0 frequency) or near-DC. The output of the down-converter 120 can be a low IF or BB signal that may be digitized by an analog-to-digital-converter (ADC) 130, which samples the analog signal at a first sampling rate $F_s$. If the down-converter 120 produced a low-IF signal, then the digitized output from ADC 130 can be further down-converted to DC by an optional digital down-converter block 140, which will produce a pair of in-phase (I) and quadrature-phase (Q) signals conveying a complex-valued BB signal. The I and Q signals may be subsequently decimated by a factor of $D_0$ in decimator 150 to remove redundant samples and correspondingly reduce the computational burden in or processing complexity of the BB DTV sensing block 160. Accordingly, a complex digital BB signal (or equivalently, a pair I,Q of real-valued digital signals) with a second sampling rate of $f_s = F_s/D_0$ may be provided to the DTV sensing block 160.

It will be appreciated that the blocks of FIG. 1 are illustrated for purposes of example, and that other variations are possible. Indeed, there may be a number of means of obtaining a complex digital BB DTV signal from an RF airwave signal, and provided as an input to the BB DTV sensing block 160.

Figure 2A:
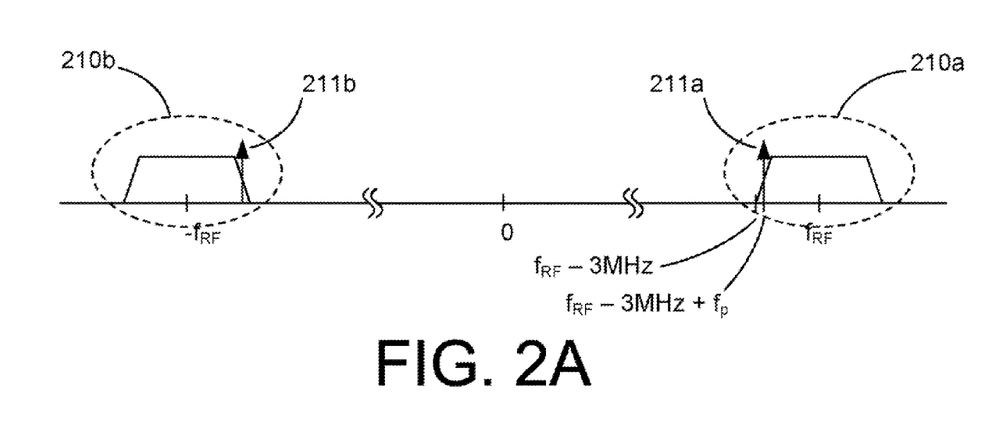
FIG. 2A shows an example structure of an example DTV signal at radio frequencies (RF), according to an example embodiment of the invention.

FIG. 2A shows an example structure of a DTV signal at RF, for example, prior to down-conversion to BB by block 140 of FIG. 1. The DTV signal 210a has a bandwidth of 6 MHz, is centered at an RF frequency $f_{RF}$, and has a pilot signal at some frequency $f_p$ above the lower band edge, i.e. $f_{RF}$−3 MHz, as illustrated by the pilot impulse 211a. It will be appreciated that the DTV signal transmitted over the air may be real-valued, thereby exhibiting conjugate symmetry as illustrated by the right-left symmetry of images 210a/210b and pilot impulses 211a/211b. Consequently, given the upper image 210a and pilot impulse 211a, the lower image 210b and pilot impulse 211b are redundant and thus offer no additional utility or information. Thus, detection processing can focus on image 210a or pilot impulse 211a without any loss of generality or performance. The RF to BB down-conversion step of block 140 in FIG. 1 thus extracts just image 210a and pilot impulse 211a except that it is shifted down to BB resulting in BB image 220 and BB pilot 221 which now resides at −3 MHz+$f_p$, as will be described further with respect to FIG. 2B. Because the signal at BB is digitized, the images are replicated in the frequency domain at every integer multiple of the frequency $f_s$, i.e. the BB sampling frequency based upon the ADC 130 and decimation block 150 of FIG. 1. Two such replicas are illustrated by 230 and 240 in FIG. 2B.

Figure 2B:
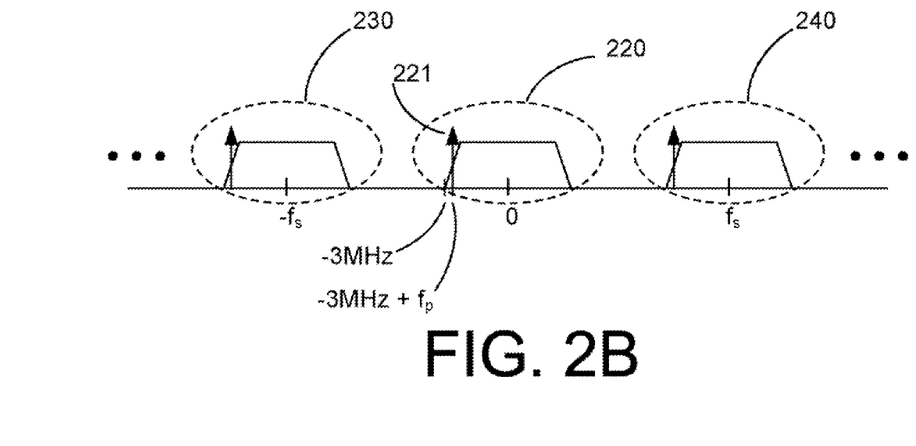
FIG. 2B shows an example structure of an example DTV signal at baseband (BB) frequencies, according to an example embodiment.

FIG. 2B illustrates an example spectrum of a complex BB digital signal fed into sensing block 160. The fundamental spectrum or image 220 is centered at DC and occupies less than 6 MHz of bandwidth, i.e. is contained within −3 MHz to +3 MHz. Because the signal is digital in nature and sampled at frequency $f_s$, replicas of the fundamental spectrum 220 are exhibited at integer multiples of $f_s$. The nearest such adjacent replicas are illustrated by images 230 and 240. A feature of a DTV signal may be the presence of a pilot tone which occurs at some frequency $f_p$ above the −3 MHz lower band edge as illustrated by the impulse 221. In the United States, the Federal Communications Commission (FCC) has declared that the value of the pilot frequency $f_p$ should be contained within the range 309.441 kHz to 349.056 kHz Consequently, embodiments of the invention may be illustrated with respect to this portion of the frequency band to detect the presence of a pilot tone to ascertain whether or not a DTV signal is present. However, it will be appreciated that the example embodiments of the invention can operate with other frequency bands as well.

Figure 3A:
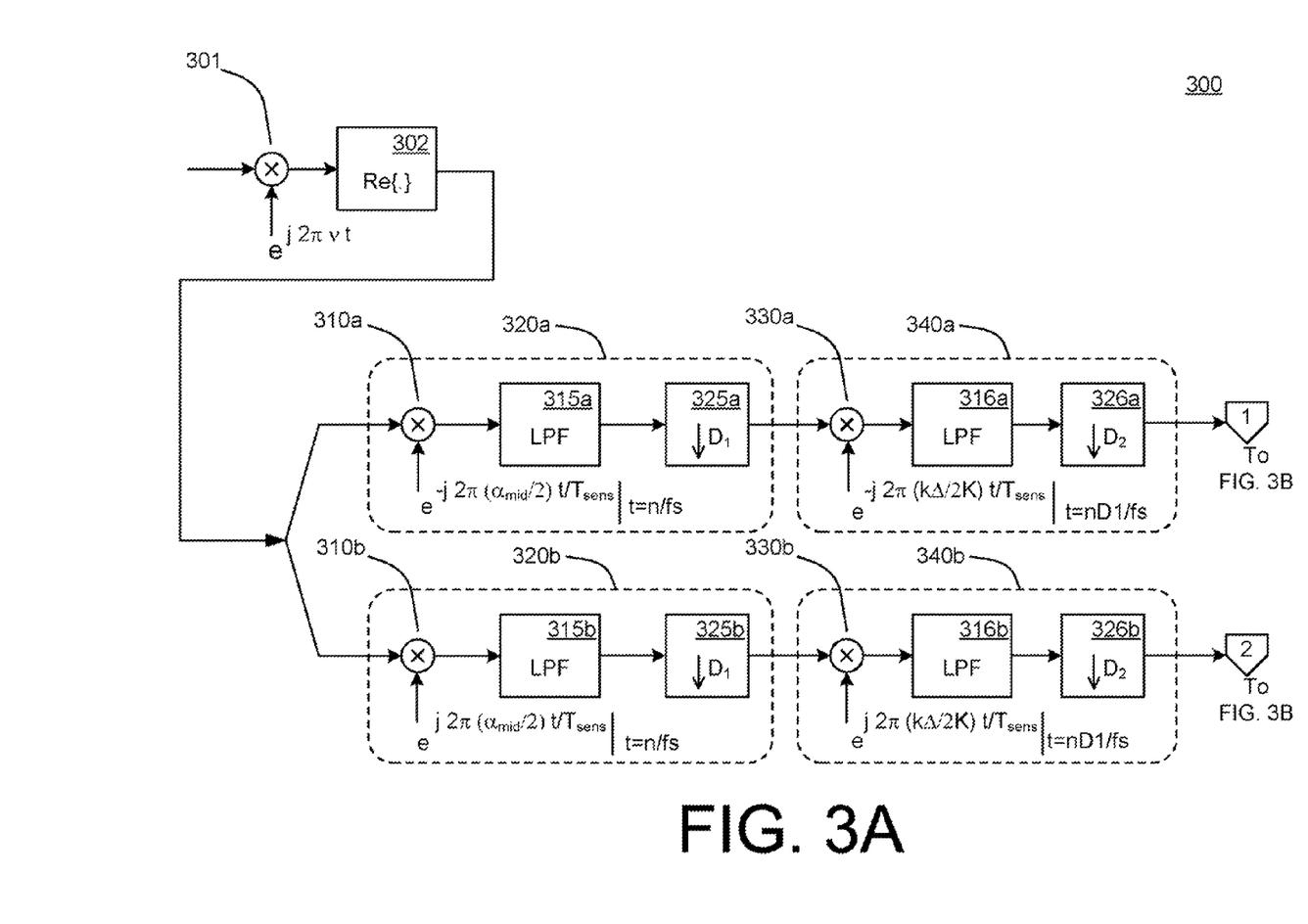
FIGS. 3A-3B illustrate a first example system for detecting a presence of a DTV pilot tone and hence an associated DTV signal, according to an example embodiment of the invention.
Figure 3B:
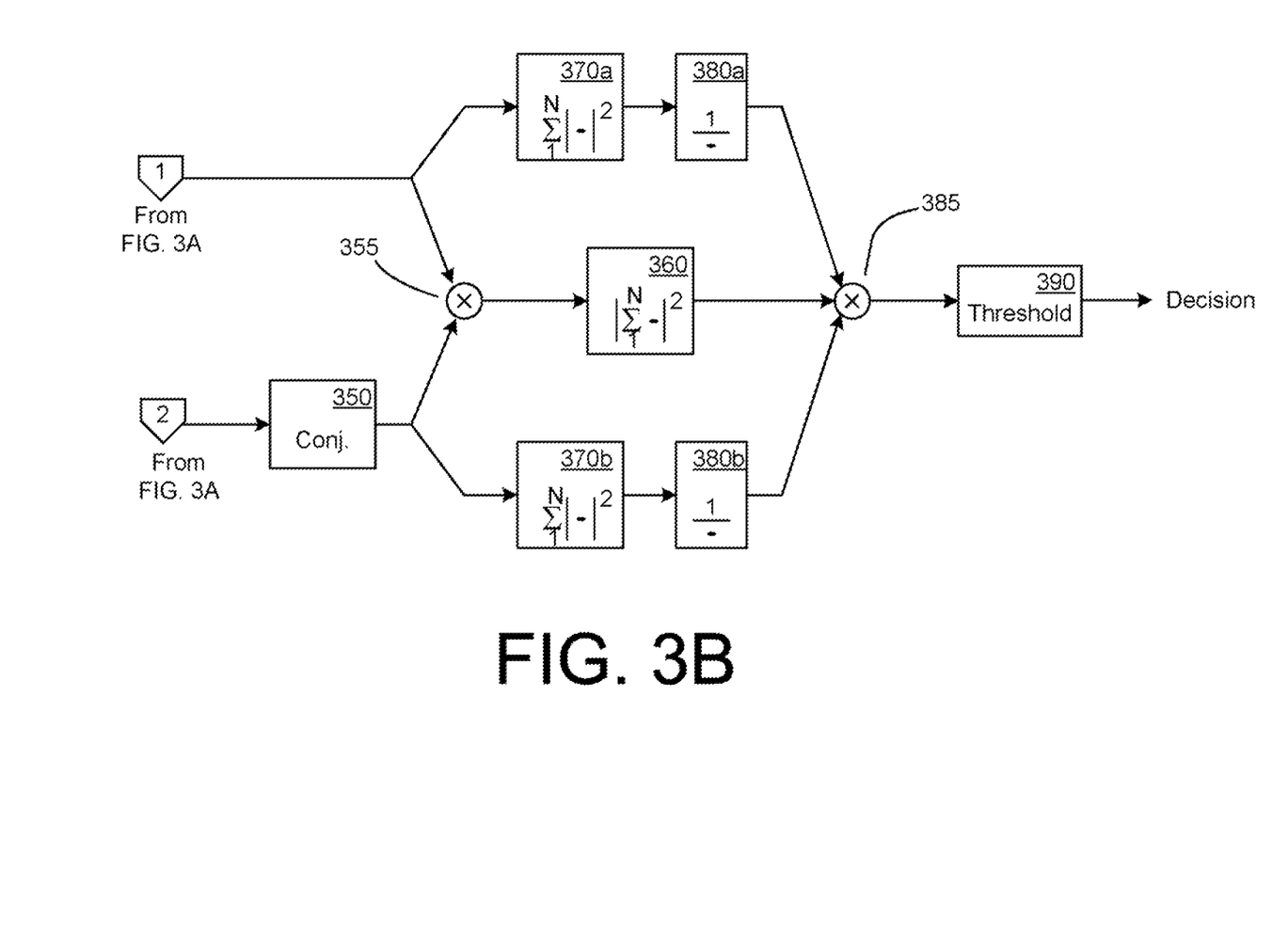

FIGS. 3A-3B illustrate a first example system 300 for detecting a presence of a DTV pilot tone and hence an associated DTV signal, according to an example embodiment of the invention. The system 300 of FIG. 3 may be an example implementation for the sensing block 160 of FIG. 1 that receives a complex BB signal. The first example system 300 may provide cyclic frequency isolation in two or more stages, which may result in computational savings when multiple cyclic frequencies are to be tested in accordance with example embodiments of the invention.

In FIGS. 3A-3B, a modulator block 301 upconverts a complex digital baseband (BB) signal by a specified frequency ν (e.g., $e\hat{\ }j \cdot 2\pi \cdot v \cdot t$) to generate an upconverted output signal. The frequency ν may chosen such that when the modulator block 301 output signal is subsequently made real by the real operator block 302, the range of valid pilot frequencies is not corrupted by other portions of the signal spectra, according to an example embodiment of the invention. Furthermore, in an alternative embodiment of the invention, the modulator block 301 may be incorporated into a down-converter such as the down-converter block 140 of FIG. 1 without any increase in computational complexity. In this case, the input passed into the sensing block 160 would be at a low IF signal rather than a BB signal. Such an alternative is considered to be within the example embodiments of the invention. However, for the sake of clarity of exposition, the two modulations will be described as separate modulation operations according to down-converter block 140 and modulator block 301.

After upconversion by modulator block 301, the DTV pilot tone/signal may reside at frequency ν+fp−3 MHz. Taking the real part of the upconverted signal by the real operator block 302 results in a signal with conjugate symmetry, and hence an additional DTV pilot tone/signal may be present at −(ν+fp−3 MHz). The output of the real operator 302 may then be evaluated for the presence of one or both of these two pilot tones/signals. Accordingly, the output of the real operator 302 may be referred to as a test signal. The test signal may be examined for tones at both $+(\alpha_{mid}/2+k\Delta/2K)$ and $-(\alpha_{mid}/2+k\Delta/2K)$, where $\alpha_{mid}/2$ may be generally chosen to be close to the center of the band where the pilot tones/signals may reside (e.g. approximately v+330 kHz–3 MHz), $\Delta$ may be the bandwidth of the range around $\alpha_{mid}/2$ to be examined for a pilot tone/signal, 2K+1 may be the number of frequencies to be tested within the band from $(\alpha_{mid}/2-\Delta/2)$ to $(\alpha_{mid}/2+\Delta/2)$, and k may be an index from –K to +K determining the particular frequency being tested.

If a DTV pilot tone is present, then there will be a value for k for which (v+fp–3 MHz) is close to $(\alpha_{mid}/2+k\Delta/2K)$, and it is desired, that for this k, the system 300 to determine or indicate that a DTV pilot tone/signal is present. Conversely, if no DTV signal is present, then it is desired that the system 300 determine or indicate the absence of a DTV pilot tone/signal for all values of k. To achieve this, the test signal output from real operator block 302 may be fed into two processing paths or branches beginning with corresponding respective modulator blocks 310a, 310b.

The first path or branch beginning with modulator block 310a may comprise two stages 320a, 340a, which may isolate the frequency content around $-(\alpha_{mid}/2+k\Delta/2K)$ in the test signal and move it down to DC. The first stage 320a may be configured to isolate the entire band of legitimate pilot frequency candidates $f_p$ and modulate it down to baseband. This may be done by first modulating the output of the real operator block 302 by modulator 310a down by a modulation frequency of $\alpha_{mid}/2$, which may be chosen to be approximately in the center of the band (e.g., v+fp–3 MHz) over all candidate values of $f_p$ (e.g., candidate pilot frequencies). Stated differently, the modulation frequency $(\alpha_{mid}/2)$ may be selected to be about half of a specified middle cyclic frequency approximately centering the band of candidate pilot frequencies $f_p$ centered near DC. It will be appreciated that $\alpha_{mid}/2$ may also deviate from the exact center to enable simpler implementations, e.g. fewer coefficients in the implementation of a modulator 310a, according to an example embodiment of the invention. The output of modulator 310a may be then low-pass filtered by low-pass filter (LPF) block 315a. The bandwidth of the LPF block 315a may be selected to be larger than the band containing all of the candidate pilot frequencies $f_p$, according to an example embodiment of the invention. The filtered output of the LPF block 315a may then be decimated by a factor of $D_1$ by decimator block 325a to reduce the number of samples used to represent the pilot band of the signal. The rate of decimation by the decimator block 325a may be commensurate with the bandwidth reduction provided by the LPF block 315a, according to an example embodiment of the invention.

In other words, modulator 310a may move the band of candidate pilot frequencies (v+fp–3 MHz) down by $\alpha_{mid}/2$, which centers it at (v+fp–3 MHz)–$\alpha_{mid}/2$ which is near DC. To minimize extraneous data, and hence processing complexity, LPF block 315a may suppresses higher frequency content outside where the pilot tone would reside. Thus, LPF block 315a may need only a 40 kHz bandwidth to pass the entire pilot band, according to an example embodiment of the invention. However, it will be appreciated that a larger bandwidth filter for block 315a may also be utilized to account for (i) any deviation between $\alpha_{mid}/2$ and the center of the band (v+$f_p$–3 MHz) over all $f_p$ and (ii) any additional sources of uncertainty in the location of the pilot frequency such as local oscillator variation or nonlinearities in the receiver. Because the range of candidate pilot frequencies $f_p$, e.g. about 40 kHz, is much smaller than the 6 MHz DTV signal band, a decimator block 325a can be used to heavily decimate the signal to significantly reduce subsequent computational complexity without sacrificing detection accuracy. As a result, the output of decimator block 325a (and equivalently stage 320a) of the first stage 320a may be a coarsely focused (in frequency), reduced sample representation of the pilot frequency band centered at or near DC. The output of the first stage 320a may be referred to as a coarsely focused signal, according to an example embodiment of the invention.

Taking the first coarsely focused signal from first stage 320a, the second stage 340a further focuses on a particular pilot tone at frequency $(\alpha_{mid}/2+k\Delta/2K)$ in the test signal and modulates that to DC to generate a first finely focused signal. Thus, whereas the first stage 320a may be configured to seek to focus on the whole range of candidate pilots frequencies, the second stage 340a may be configured to focus on a particular pilot frequency associated with a particular value of k between –K and +K. The second stage 340a may have a similar structure as 320a, but with a different parameterization. In particular, the second stage 340a may first apply a modulation with a frequency perturbation of $-k\Delta/2K$ by modulator block 330a, thereby moving the frequency $k\Delta/2K$ in the first coarsely focused signal to DC. The second stage 340a then applies a LPF block 316a to the output of modulator block 330a to suppress the frequency content away from DC in the output of 330a, or in other words to suppress frequency content away from frequency $k\Delta/2K$ in the first coarsely focused signal, or in yet other words to suppress frequency content away from $(\alpha_{mid}/2+k\Delta/2K)$ in the test signal. Being a reduced bandwidth signal, the output of LPF block 316a may have redundant samples which are removed by a decimator block 326a that decimates the signal by a factor of $D_2$. The rate of decimation by the decimator block 326a may be commensurate with the bandwidth reduction imposed by the LPF block 316a, according to an example embodiment of the invention. The resulting output of decimator block 326a (and likewise the second stage 340a) may be a desired narrowly focused content at frequency $(\alpha_{mid}/2+k\Delta/2K)$ in the test signal but modulated down to DC.

It will be appreciated that the second processing branch comprising stages 320b, 340b may operate analogously to the respective stages 320a, 340a in the first processing branch described above. However, a difference between the two branches may be the frequency driving the modulators 310b and 330b in the second branch, i.e. how the signal spectrum of the test signal and coarsely focused signal, respectively, are shifted. In particular, instead of using modulator 310a to shift the spectra down by $\alpha_{mid}/2$, modulator 310b may be used to shift the spectra up by $\alpha_{mid}/2$ so that stage 320b produces a second coarsely focused signal around frequency $-\alpha_{mid}/2$ in the test signal. Similarly, instead of using modulator 330a to shift the spectra down by $k\Delta/2K$, modulator 330b may be used to shift the spectra up by $k\Delta/2K$ so that stage 340b produces a second finely focused signal around frequency $-(\alpha_{mid}/2+k\Delta/2K)$ in the test signal. Thus, it is not the test signal content at frequency $(\alpha_{mid}/2+k\Delta/2K)$ that is focused, but rather, the test signal content at frequency $-(\alpha_{mid}/2+k\Delta/2K)$, according to an example embodiment of the invention. The LPF block 315b may be configured with substantially the same parameters (e.g., bandwidth) as the LPF block 315a, and LPF block 316b may be configured with substantially the same parameters as the LPF block 316a. Similarly, the decimator block 325b may operate with substantially the same parameters (e.g., decimation rate) as the decimator block 325a, and decimator block 326b may operate with substantially the same parameters as the decimator block 326a, according to an example embodiment of the invention. Thus, the resulting output of decimator block 326b (and likewise the second stage 340b) may be a desired narrowly focused content at frequency $-(\alpha_{mid}/2+k\Delta/2K)$.

With the test signal spectra at $(\alpha_{mid}/2+k\Delta/2K)$ and $-(\alpha_{mid}/2+k\Delta/2K)$ isolated and modulated to DC, blocks 350, 355, and 360 may then check for the presence of conjugate symmetry. In particular, conjugate block 350 may take the conjugate of the output signal from the second branch which isolated the negative frequency $-(\alpha_{mid}/2+k\Delta/2K)$ and modulated it up to DC. Multiplier block 355 may then multiply or otherwise combine the outputs of stage 340a in the first processing branch and the output of conjugate block 350, which is the conjugated output of the second processing branch, to generate a correlation estimate. Energy block 360 may then generate an estimate of the correlation energy by first, optionally, coherently averaging or summing the output of multiplier block 355, thereby improving upon the initial estimate of correlation, and then taking the magnitude square of the result.

It will be appreciated that if a DTV pilot tone exists at frequency $(\alpha_{mid}/2+k\Delta/2K)$ in the test signal, then the correlation estimate output by the multiplier block 355 should be steady in phase. The in-phase output of the multiplier block should then result in a signal that adds constructively and results in a large signal magnitude at the output of the energy block 360. On the other hand, in the absence of a DTV pilot, the multiplier block 355 outputs should be driven by noise and have random phases, and thus add destructively, resulting in a small magnitude at the output of the energy block 360.

The correlation energy estimate output by the energy block 360 may be used to determine whether an ATSC or other DTV signal is declared present in the received RF signal. However, the correlation energy estimate from block 360 may need to be normalized based upon background noise energy frequencies. To do so, energy detection blocks 370a, 370b may be used to estimate the background noise energy around frequencies $+(\alpha_{mid}/2+k\Delta/2K)$ and $-(\alpha_{mid}/2+k\Delta/2K)$, respectively, in the respective test signal of the respective first and second branches. In particular, energy detection blocks 370a, 370b may output the sum of the squared-magnitudes of their input samples (also referred to as the "energy estimate") to generate respective normalization factors. These respective normalization factors may then be fed into inverse blocks 380a, 380b, respectively, which may take the reciprocal of the energy estimate from the respective blocks 370a, 370b. Multiplier 385 then takes the product of the respective outputs of blocks 380a, 380b, and 360. In effect, the output of multiplier 385 may be a normalized correlation energy estimate that is derived by dividing (e.g., multiplying the inverse output by blocks 380a, 380b) the correlation energy estimate from block 360 by one or both of the respective normalization factors from blocks 370a, 370b.

It will be appreciated that normalized correlation energy estimate output by multiplier 385 may be a cyclic autocorrelation or spectral correlation density (SCD) estimate evaluated at frequency $(\alpha_{mid}/2+k\Delta/2K)$ normalized by the background energy, i.e. an estimate of the spectral auto-coherence function (SACF). The normalized correlation energy estimate output of multiplier 385 may be compared to one or more thresholds in the threshold block 390 to determine whether a DTV pilot tone (and hence an associated DTV signal) is present. For example, if the normalized correlation energy estimate exceeds a threshold, then a DTV pilot tone (and hence an associated DTV signal) may be determined to be present. On the other hand, if the normalized correlation energy estimate does not exceed the threshold, then a DTV pilot tone (and hence and associated DTV signal) may be determined to not be present. It will be appreciated that the process illustrated in FIG. 3B may be described as a test for gauging cyclostationarity for determining whether a DTV signal is present.

It will be appreciated that in the example system 300, the division of processing in two stages (320 & 340) may result in significant computational savings. Indeed, the full-rate processing performed in the first stage 320 (e.g., 320a/320b) needs to be performed only once regardless of the number of cyclic frequencies $(\alpha_{mid}/2+k\Delta/2K)$ tested in the test signal. In addition, the subsequent second stage 340 (e.g., 340a/340b) performed for each individual cyclic frequency $(\alpha_{mid}/2+k\Delta/2K)$ may be of much reduced complexity due to decimation block 325 (e.g., 325a/325b). By contrast, other teachings in the prior and conventional art perform full rate processing for each cyclic frequency tested. In practical application, the number of tested cyclic frequencies can easily approach numbers in the thousands, so the proposed computational savings can be quite significant. Accordingly, the configuration of the system 300 may be utilized to minimizing cost and complexity, according to an example embodiment of the invention.

It will be appreciated that in assessing conjugate symmetry at a particular frequency of the test signal, the conjugation block 350 can be applied to either of the processing branches feeding multiplier 355. Indeed, the conjugation block 350 could alternatively be applied to the output of block 340a without departing from example embodiments of the invention.

It will also be appreciated that each LPF and decimator pair (315a/325a, 315b/325b, 316a/326a, 316b/326b) can actually comprise multiple LPF and decimator stages without departing from example embodiments of the invention. Using multiple such LPF and decimator stages may enable the use of lower order filters, which can result in computational savings in accordance with example embodiments of the invention.

Figure 4A:
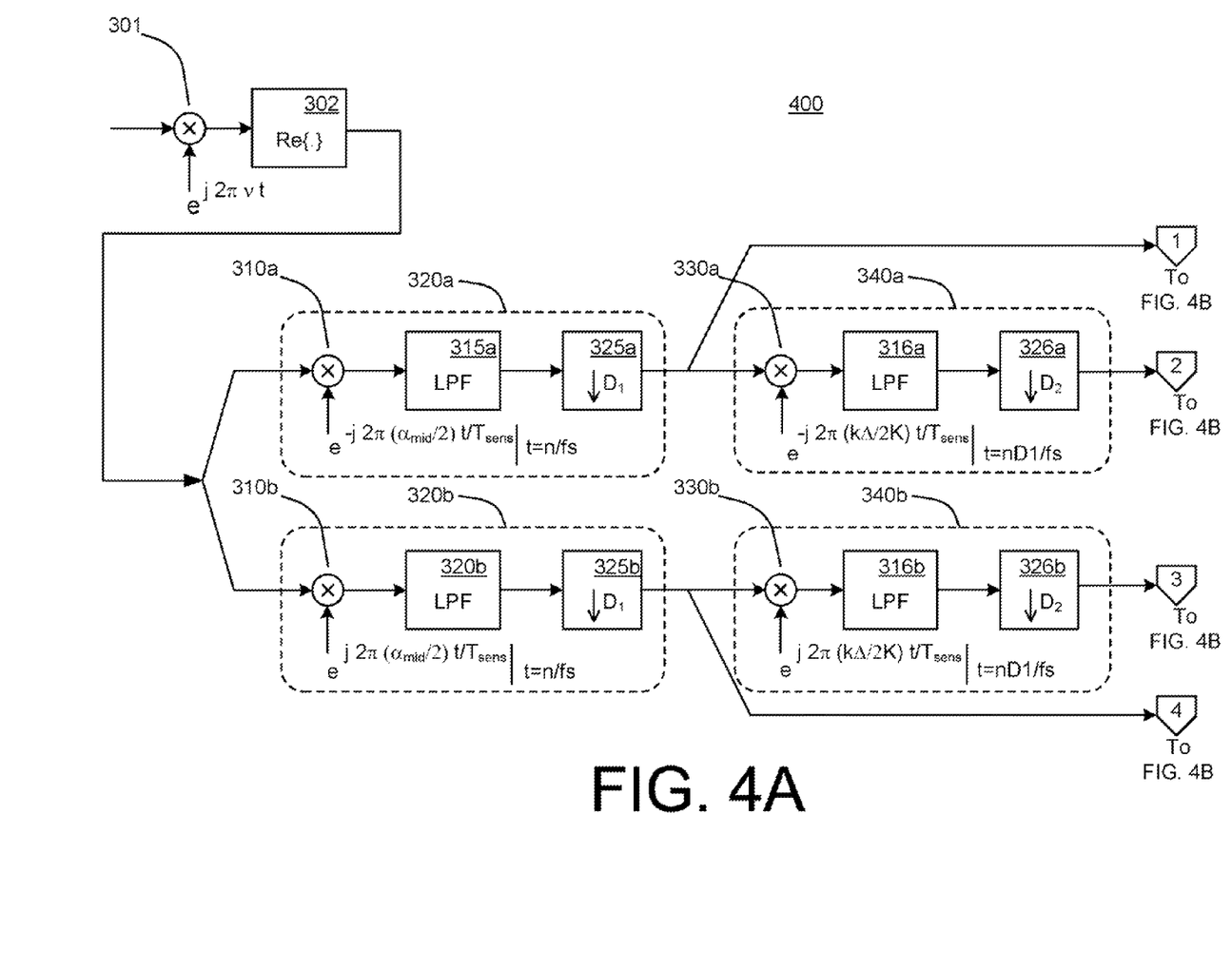
FIGS. 4A-4B illustrates a second example system for detecting a presence of a DTV pilot tone and hence an associated DTV signal, according to an example embodiment of the invention.
Figure 4B:
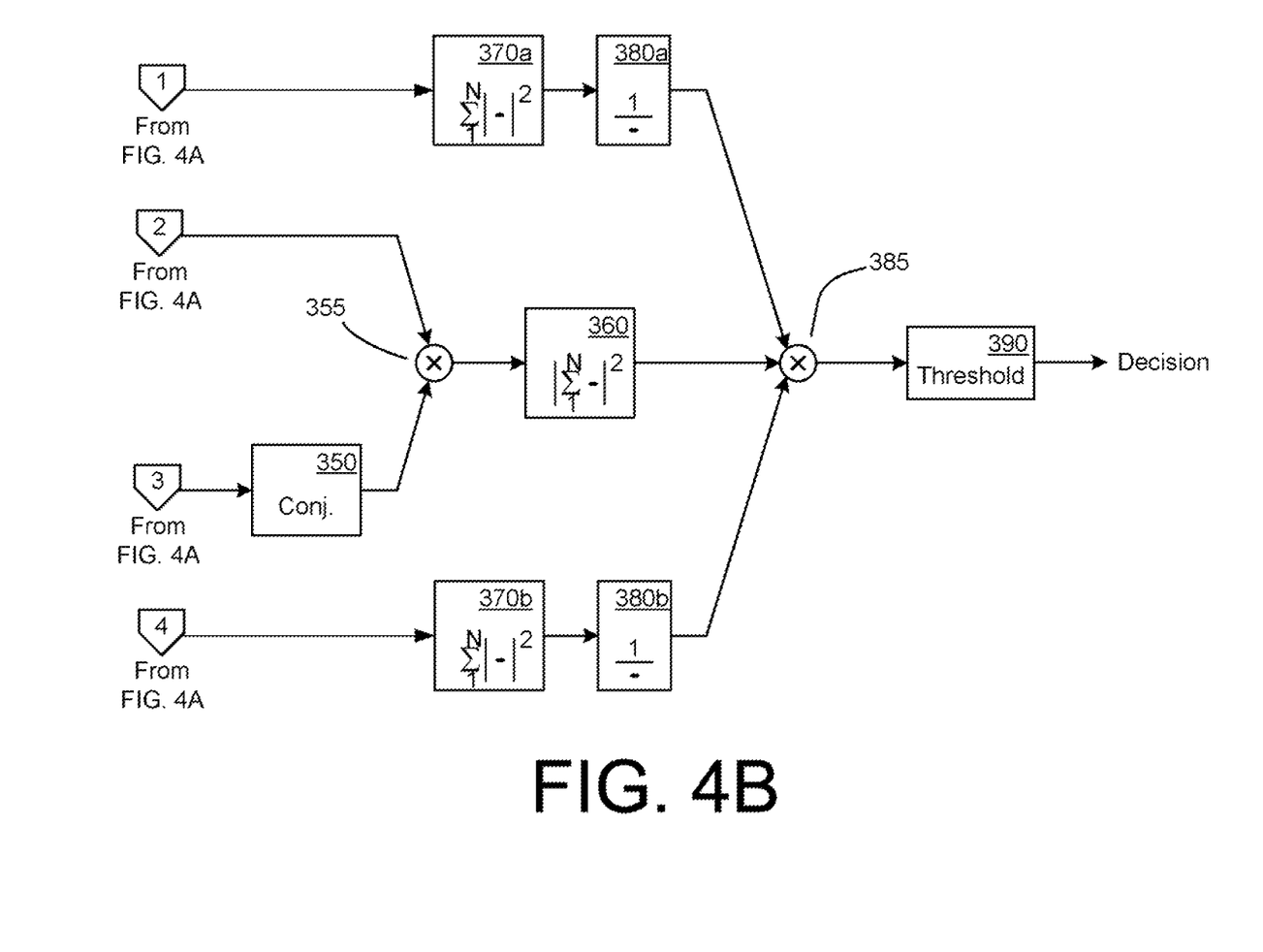

FIGS. 4A-4B illustrates a second example system 400 for detecting a presence of a DTV pilot tone and hence an associated DTV signal, according to an example embodiment of the invention. In general, in system 400, disparate frequency bands may be used to estimate the respective background energy and spectral correlation density (SCD). The system 400 can be understood as a variation of the system 300 described above. Indeed, in comparison, the system 400 provides a different input to the energy detection blocks 370a and 370b. Indeed, while the same signal can be used for both SCD and background noise energy estimation as with the system 300, the system 400 uses different signals for the two tasks.

It will be appreciated that the SCD estimator's fidelity may be maximized by minimizing the bandwidths of the two signals feeding multiplier 355, but doing so may also minimize the fidelity of the background energy estimate due to the high variance of small sample statistics. Thus, in system 400, a different signal can be used to estimate the background noise. In particular, the respective coarsely focused signals output from the first focusing stages 320a, 320b may be provided as respective inputs to the energy detection blocks 370a, 370b instead of the more highly focused signals output from the second focusing stages 340a, 340b. Using the former signals from the first stages 320a, 320b in place of the latter from the second stages 340a, 340b has a higher statistical significance because it has a much larger bandwidth. It will be appreciated that the variability of a mean of signal may be inversely proportional to its bandwidth when subject to a fixed sensing or averaging time period. Consequently, the variability in the background energy estimates used in system 400 can be orders of magnitude lower than that of system 300, thereby resulting in an improvement in detection performance. Furthermore, it will be appreciated that there are other points in the signal processing path which could be used as the input to the energy estimation blocks 370a, 370b without departing from example embodiments of the invention. Accordingly, the configuration in the system 400 may be utilized when there is uncertainty in the amount or background noise of energy. Without such capabilities provided by the system 400, DTV sensing systems would either (i) have to increase operational margin by increasing sensing time, thereby going against a key requirement of DTV sensing systems to perform the detection in as short a time as possible or (ii) have to accept worse detection performance in cases where the background energy was different than the implicitly assumed value, thereby going against another key requirement of being flexible to varying amounts of ambient background noise radiation.

Figure 5A:
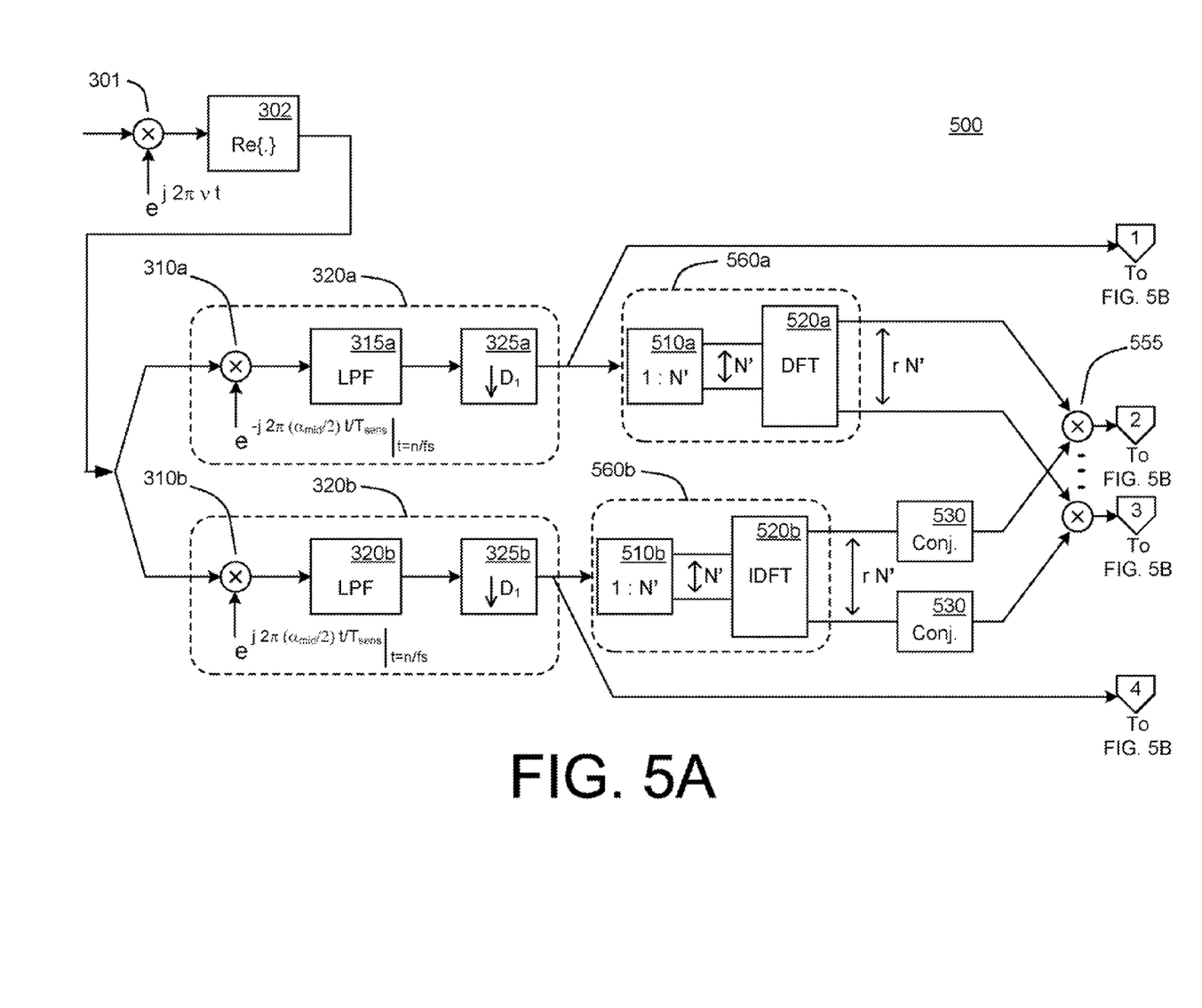
FIGS. 5A-5B illustrates a third example system for detecting a presence of a DTV pilot tone and hence an associated DTV signal, according to an example embodiment of the invention.
Figure 5B:
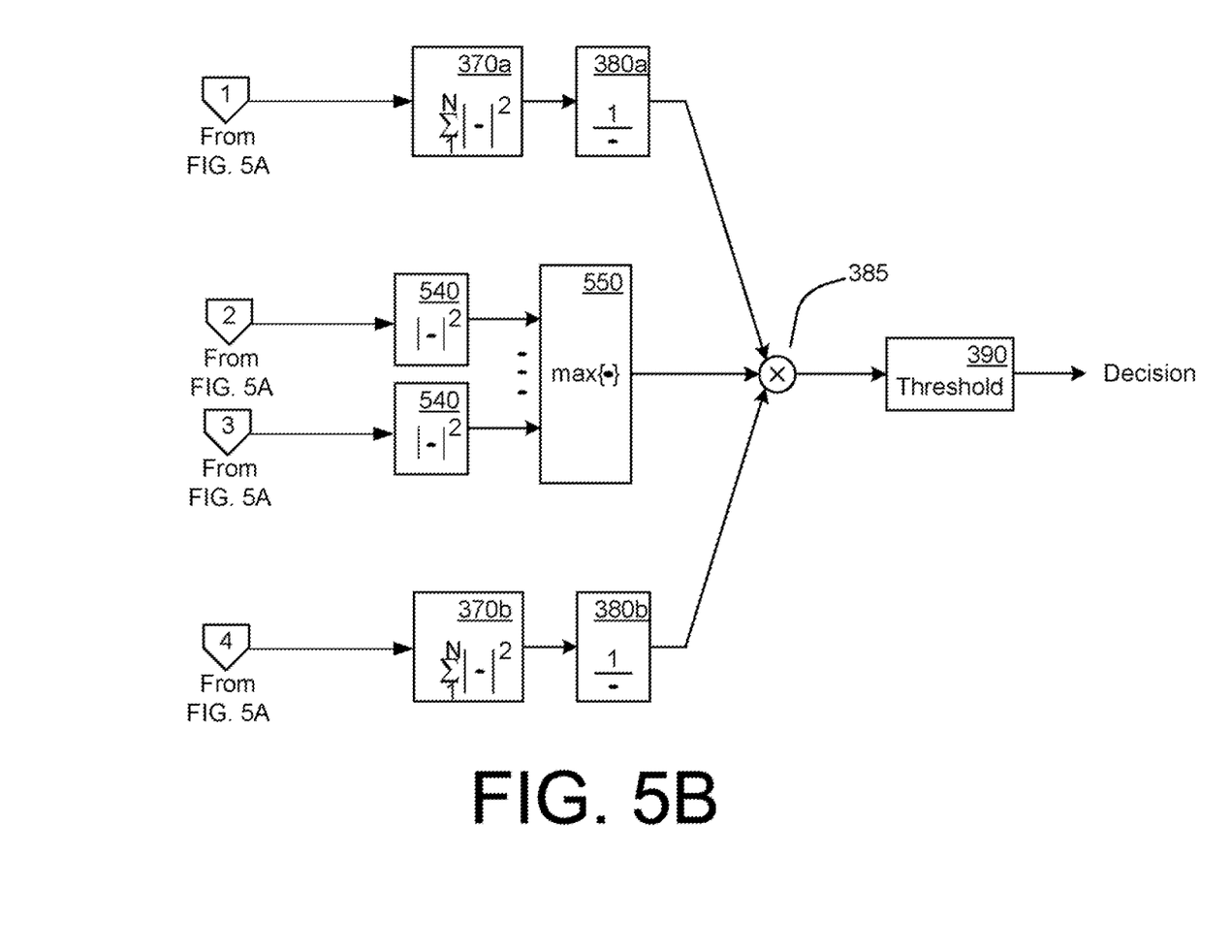

FIGS. 5A-5B illustrates a third example system 500 for detecting a presence of a DTV pilot tone and hence an associated DTV signal, according to an example embodiment of the invention. In general, the system 500 may perform a fine focusing state cyclic frequency isolation for all cyclic frequencies using a Fast Fourier Transform (FFT) and an inverse FFT (IFFT). The system 500 can be understood as a variation of the systems 300 or 400 described above. To start, consider the second focusing stage 340a, 340b in either system 300 or 400. If the LPF blocks 316a, 316b and decimator blocks 326a, 326b are taken to the limiting case where a maximum amount of averaging (i.e. using all available data samples) is performed and a single sample is kept (i.e. maximum decimation), then the two instances of the second stage 340a, 340b degenerate into the k-th DFT coefficient and k-th IDFT coefficient, respectively, of the input to signals to the second stages 340a, 340b. It will be appreciated that there exist computationally efficient Fast Fourier Transform (FFT) and inverse FFT (IFFT) algorithms to efficiently compute these DFT and IDFT coefficients that may be faster than the block implementation shown in FIGS. 3 and 4. Furthermore, use of the FFT and IFFT may enable a means to very efficiently simultaneously compute the outputs of the second stages 340a, 340b for all cyclic frequencies, i.e. values of k, according to an example embodiment of the invention. In other words, the sequence of DFT coefficients may correspond to the cyclostationarity present in the signal at various cyclic frequencies. Accordingly, alternate embodiments of the second focusing stage 560a, 560b include efficient means of parallelization that can simultaneously produce outputs that are focused on each of the tested frequencies ($\alpha_{mid}/2 + k\Delta/2K$) for each k. One such example embodiment may include an optional deserializing buffer 510a, 510b, for each second focusing stage 560a, 560b, whose function is to collect a number N' of consecutive or serial samples from a first focusing 320a, 320b. Once N' samples are collected, the buffer 510a, 510b passes in parallel all N' samples to the DFT block 520a or IDFT block 520b. Such an implementation as in stages 560a, 560b can be more time efficient, computationally efficient, and space efficient (in terms of memory taken up by code in a program or gates in a hardware implementation) than simply making 2K+1 replicas of blocks 340a, 340b to test all frequencies of interest in parallel. Thus, this example third system 500 may be utilized to minimize cost and complexity, according to an example embodiment of the invention.

Furthermore, the use of the FFT and IFFT can represent the limit point of taking the filtering to the extreme value, which in some cases may not be realizable with conventional LPF parameterizations. In other words, use of the FFT and IFFT in respective second stages 560a, 560b may produce the maximum smoothing and focusing in 340a, 340b to achieve optimal detection performance. Thus, the embodiment in FIGS. 5A-5B may also be utilized to detect weak signals and to do so in a minimum amount of time, according to an example embodiment of the invention.

For a given pair of DFT and IDFT outputs from respective DFT block 520a and IDFT block 520b, respectively, one of the two sets of values may be conjugated by conjugation block 530 and then the pair is multiplied by a multiplier 555. FIGS. 5A-5B illustrates the conjugation of the IDFT 520b outputs by conjunction block 530, but the DFT 520a outputs can be alternatively conjugated, according to an example embodiment of the invention. The multiplied outputs of 555 may then fed into a magnitude block 540 that takes the magnitude-square of the complex value to generate a set of correlation energy estimates. This magnitude block 540 may be similar to block 360, but since a maximum amount of averaging is now being performed, there is just N=1 sample to process, so it degenerates to a single magnitude-square operation for each value of k being tested. All 2K+1 magnitude-squares may then be compared in a max-operator block 550 where the maximum correlation energy estimate value is kept as a representative correlation energy estimate. This is done because if any one of the cyclic frequencies indicates the presence of a DTV pilot, then the system 500 declares a DTV signal as present. Thus, it is equivalent to just examining the largest of the magnitude outputs, which is passed to the threshold block 390.

The representative correlation energy estimate output by block 550 may then be normalized based upon background noise energy frequencies. Thus, energy detection blocks 370a, 370b may receive the respective first focused signal output from the first focusing stage 320a, 320b and output the sum of the squared-magnitudes of their input samples as respective normalization factors. These respective normalization factors may then be fed into inverse blocks 380a, 380b, respectively, which may take the reciprocal of the energy estimate from the respective blocks 370a, 370b. Multiplier 385 then takes the product of the respective outputs of blocks 380a, 380b, and 550, which in effect divides the representative correlation energy estimate output from block 550 by one or both of the normalization factors from blocks 370a, 370b. The normalized correlation energy estimate output of multiplier 385 may be compared to one or more thresholds in the threshold block 390 to determine whether a DTV pilot tone (and hence an associated DTV signal) is present, as described herein.

Aspects of FIGS. 5A-5B may appear differently than FIGS. 3A-3B and 4A-4B due to the presence of blocks 540 and 550 and the removal of block 360, but these blocks may be considered equivalent. The reason for the discrepancy is that FIG. 5 covers the testing of all cyclic frequencies at once, i.e. it shows the parallel processing for all values of k. In contrast, FIGS. 3A-3B and 4A-4B only cover the testing for a single cyclic frequency and thus does not illustrate the parallelism that would be needed. This may be done to simplify the figures and because the systems 300 and 400 could be implemented for all cyclic frequencies based on FIG. 3 or 4 alone.

It will be appreciated that the DFT 520a and IDFT 520b may be oversampled so that for N' input samples, r*N' output samples are produced where r>1. Oversampling, also known as zero-padding the input, may be used to overlap finely focused frequency bands to test and provide improved test robustness when the pilot may reside at the boundary between a pair of adjacent non-overlapping frequency bands.

Figure 6:
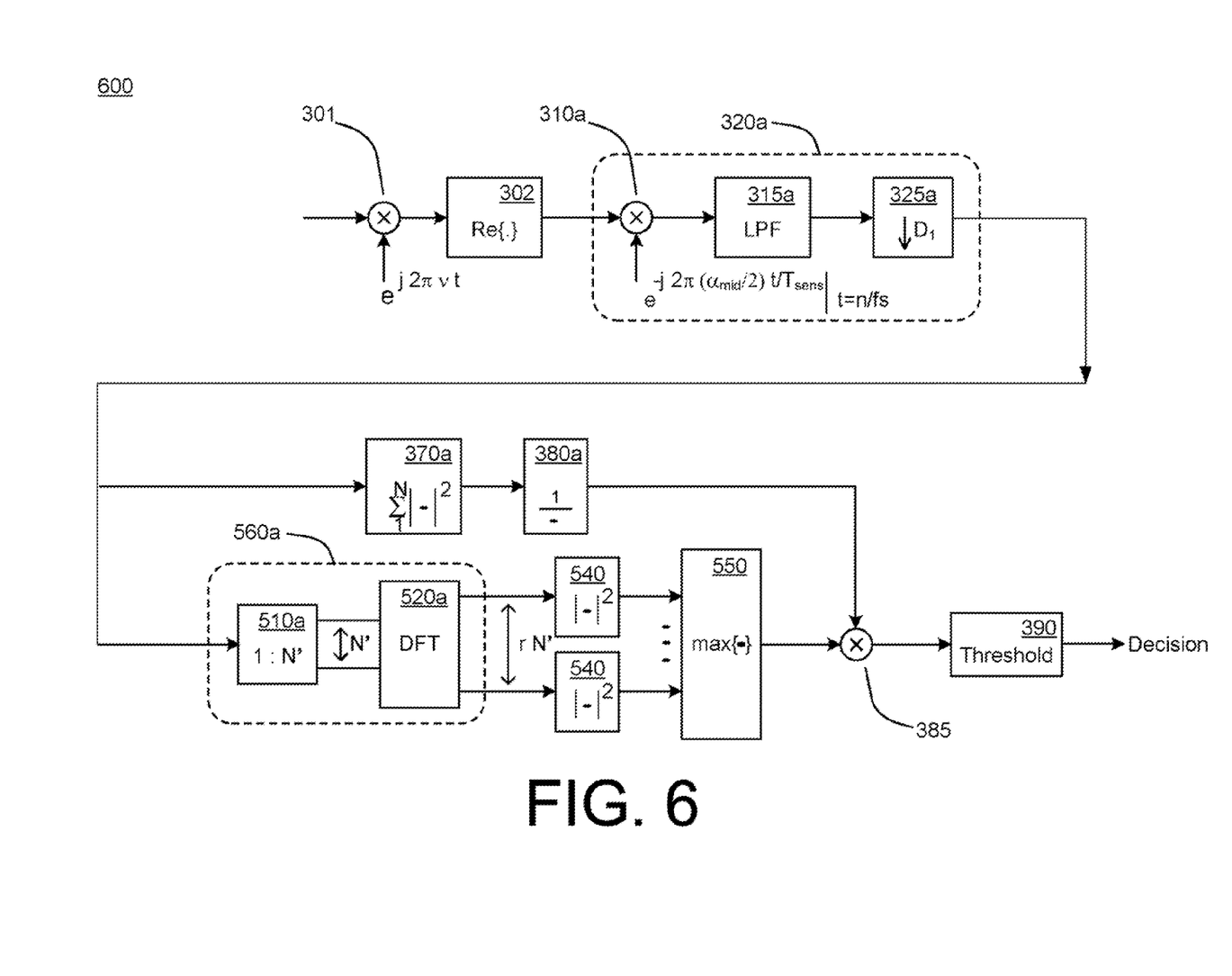
FIG. 6 illustrates a fourth system for detecting a presence of a DTV pilot tone and hence an associated DTV signal, according to an example embodiment of the invention.

FIG. 6 illustrates a fourth system 600 for detecting a presence of a DTV pilot tone and hence an associated DTV signal, according to an example embodiment of the invention. The system 600 can be understood as a variation of the system 500 described above. It will be appreciated that the system 500 exhibits a large degree of conjugate symmetry in the frequency domain. In particular, the output of the real operator 302 is a real signal and thus has a Fourier Transform, i.e. frequency domain representation, that is conjugate symmetric. One skilled in the art will also realize that first stages 320a and 320b are identical except for that the modulations 310a and 320b are of opposite frequency. Consequently, in frequency domain representations, the output of stage 320a is the conjugate of the frequency-negated output of stage 320b. Next, note that the processing of second stages 560a and 560b are identical except that 560a is a forward DFT and 560b is an inverse DFT, which effectively negates the frequency variable. Consequently, the outputs of 560a and 560b will be conjugates of each other. In other words, conjugation by conjugate block 530 of the output of 560b will yield the same signal at the output of 560a in system 500. Hence, the two processing branches comprising stages 320a plus 560a and 320b plus 560b are redundant.

Based upon this redundancy, the fourth system 600 of FIG. 6 thus removes one of the redundant branches blocks 320a plus 560a (along with accompanying 370a and 380a) or 320b plus 560b (along with accompanying 370b and 380b) to remove unnecessary computation. The system 600 in FIG. 6 shows the latter modification. It is furthermore noted that regardless of which processing branch is removed from system 500, the set of conjugation blocks 530 are unnecessary and can be removed for the reduced system 600.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for detecting a digital television (DTV) signal, comprising:
modulating a received radio frequency (RF) signal downwards to generate a down-converted modulated signal at a lower intermediate frequency (IF) or baseband frequency;
digitizing the modulated signal to generate a digitized baseband signal;
retaining a real portion of the digitized baseband signal to generate a test signal;
performing an initial focusing of the test signal to generate a focused signal by at least modulating the test signal downwards by a modulation frequency to generate a modulated test signal, wherein the modulation frequency is based upon a specified middle cyclic frequency associated with a band of candidate pilot frequencies, wherein the focused signal is derived from one or both of filtering or decimating the modulated test signal;
performing a fine focusing on the focused signal to generate an output signal by:
collecting, from the focused signal, a sequence of samples spanning a time period less than or equal to a system sensing time requirement;
obtaining Discrete Fourier Transform (DFT) coefficients of the collected sequence of samples, where the sequence of DFT coefficients corresponds to the cyclostationarity present in the received RF signal at various cyclic frequencies;
determining a set of correlation energy estimates based upon the DFT coefficients;
determining a representative correlation energy estimate as a maximum or largest correlation energy estimate from the determined set of correlation energy estimates,
normalizing the representative correlation energy estimate by a normalization factor, wherein the normalization factor is based upon the focused signal,
wherein the normalized correlation energy estimate is used to determine whether a digital television (DTV) signal is present in the received RF signal.

2. The method of claim 1, wherein the RF signal is received from an antenna.

3. The method of claim 1, wherein the modulation frequency is substantially half of the specified middle cyclic frequency approximately centering the band of candidate frequencies around DC.

4. The method of claim 1, wherein the focused signal is derived from one or both of filtering or decimating the modulated test signal by: (i) applying a low-pass filter to the modulated test signal to generate a filtered output, wherein a bandwidth of the low-pass filter is larger than the band of the candidate pilot frequencies, and/or (ii) decimating the filtered output of the low-pass filter at a rate to generate the focused signal, wherein the rate is configured to reduce a sampling rate while not aliasing the filtered output.

5. The method of claim 1, wherein the set of correlation energy estimates is determined by taking a magnitude square of the DFT coefficients.

6. The method of claim 1, wherein the normalization factor is determined by measuring signal energy associated with the focused signal.

7. The method of claim 1, wherein normalizing the representative correlation energy estimate includes dividing the representative correlation energy estimate by the normalization factor.

8. The method of claim 1, wherein the normalized correlation energy estimate is compared to a threshold to determine whether the DTV signal is present in the received RF signal.

9. The method of claim 1, wherein the DFT coefficients are obtained by applying an inverse Discrete Fourier Transform to the collected sequence of samples.

10. The method of claim 1, wherein the correlation energy estimate is determining by taking a magnitude of the DFT coefficients.

11. A system for detecting a digital television (DTV) signal, comprising:
a first modulator that modulates a received radio frequency (RF) signal downwards to generate a down-converted modulated signal at a lower intermediate frequency (IF) or baseband frequency;
an analog-to-digital converter that digitizes the modulated signal to generate a digitized baseband signal;
a real-operator block that retains a real portion of the digitized baseband signal to generate a test signal;
an initial focusing stage, wherein the initial focusing stage generates a focused signal from the test signal by at least modulating, by a second modulator, the test signal downwards by a modulation frequency to generate a modulated test signal, wherein the modulation frequency is based upon a specified middle cyclic frequency associated with a band of candidate pilot frequencies, wherein the focused signal is derived from one or both of filtering or decimating the modulated test signal by a respective filter or decimator;

a fine focusing stage, wherein the fine focusing stage generates an output signal from the focused signal by collecting, from the focused signal, a sequence of samples spanning a time period less than or equal to a system sensing time requirement, and obtaining Discrete Fourier Transform (DFT) coefficients of the collected sequence of samples via a DFT block, where the sequence of DFT coefficients corresponds to the cyclostationarity present in the received RF signal at various cyclic frequencies;

one or more magnitude blocks that determine a set of correlation energy estimates based upon the DFT coefficients;

a max operator block that determines a representative correlation energy estimate as a maximum or largest correlation energy estimate from the determined set of correlation energy estimates, wherein the representative correlation energy estimate is normalized by a normalization factor, wherein the normalization factor is based upon the focused signal, wherein the normalized correlation energy estimate is used to determine whether a digital television (DTV) signal is present in the received RF signal.

12. The system of claim 11, further comprising an antenna that receives the RF signal and delivers the received RF signal to the first modulator.

13. The system of claim 11, wherein the modulation frequency is substantially half of the specified middle cyclic frequency approximately centering the band of candidate frequencies around DC.

14. The system of claim 11, wherein the focused signal is derived from one or both of filtering or decimating the modulated test signal by: (i) filter low-pass filtering to the modulated test signal to generate a filtered output, wherein a bandwidth of the low-pass filter is larger than the band of the candidate pilot frequencies, and/or (ii) the decimator decimating the filtered output of the low-pass filter at a rate to generate the focused signal, wherein the rate is configured to reduce a sampling rate while not aliasing the filtered output.

15. The system of claim 11, wherein the set of correlation energy estimates is determined by the one or more magnitude blocks taking a magnitude square of the DFT coefficients.

16. The system of claim 11, further comprising:
an energy detector that measures signal energy associated with the focused signal, wherein the normalization factor is determined from the measured measuring signal energy associated with the focused signal.

17. The system of claim 11, wherein the representative correlation energy estimate is normalized by dividing the representative correlation energy estimate by the normalization factor.

18. The system of claim 11, further comprising:
a threshold block that compares the normalized correlation energy estimate to a threshold to determine whether the DTV signal is present in the received RF signal.

19. The system of claim 11, wherein the DFT coefficients are obtained by applying an inverse Discrete Fourier Transform to the collected sequence of samples.

20. The system of claim 11, wherein the correlation energy estimate is determined by the one or more magnitude blocks taking a magnitude of the DFT coefficients.

* * * * *